(12) United States Patent
Cordeiro

(10) Patent No.: US 8,326,683 B2
(45) Date of Patent: *Dec. 4, 2012

(54) METHOD AND APPARTUS FOR PERSONALIZED CONSUMER TO BUSINESS MATCHMAKING

(76) Inventor: Alvin Cordeiro, Aptos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,536

(22) Filed: Dec. 5, 2011

(65) Prior Publication Data

US 2012/0078806 A1    Mar. 29, 2012

Related U.S. Application Data

(62) Division of application No. 12/009,214, filed on Jan. 16, 2008, now Pat. No. 8,131,586.

(51) Int. Cl.
*G06Q 40/00* (2012.01)
(52) U.S. Cl. .......................................................... 705/14
(58) Field of Classification Search ...................... 705/14
See application file for complete search history.

(56) References Cited

U.S. PATENT DOCUMENTS

| | | | |
|---|---|---|---|
| 6,236,975 B1 * | 5/2001 | Boe et al. ..................... | 705/7.32 |
| 7,752,201 B2 * | 7/2010 | Anderson et al. ............ | 707/731 |
| 2002/0087450 A1 * | 7/2002 | Reddy ............................. | 705/37 |
| 2005/0131757 A1 * | 6/2005 | Chan et al. ...................... | 705/14 |
| 2007/0239556 A1 * | 10/2007 | Wagner ............................ | 705/26 |

* cited by examiner

*Primary Examiner* — Jessica Lemieux

(74) *Attorney, Agent, or Firm* — Invent Capture, LLC; Samuel S. Cho

(57) ABSTRACT

A personalized consumer to business matchmaking apparatus and its related method correlate and quantify a personalized match between a business offering products or services to a searching consumer looking for the reviewed products or services. In one embodiment of the invention, the personalized consumer to business matchmaking is based on requirements, traits, and profiles of the business, the searching consumer, and business evaluators who have reviewed the business. Whereas conventional consumer reviews such as star-ratings merely give an average rating based on inputs from the business evaluators, the personalized consumer to business matchmaking apparatus and its related method generate a personalized match score based on individual traits, requirements, and profiles of the business, the searching consumer, and the business evaluators.

8 Claims, 18 Drawing Sheets

**Searching Consumer to Business Match Score (SCBMS)
and Consumer to Business Match Score (CBMS)**

Searchable business profile information: (0 points)

20) BCS Assigned Company ID#
21) Company Name, Address, City, State, Zip
22) Phone number
23) Fax number
24) Web site address
25) Business/Contractors license number
23) About the business paragraph
27) Key words or phrases describing the business offerings:
28) Value added services or product offerings. (i.e. the company's unique value proposition: Auto shop provides shuttle services, Hand car wash, bonded house cleaners)
29) Awards, other reviews (links to other sites where the business has been reviewed), customer surveys or case studies
30) Pricing for products or services.
31) Business contacts – Names, Titles, email addresses, direct phone numbers

Figure 3

Business consumer match criteria and scores:

32 - Service Area: (Maximum 40 Points)
32a - State (40 Points)
32b - Area code (40 Points)
32c - City (40 Points)
32d - Zip Code (40 Points)
32e - Any/All of the above (5 points)

33 - Primary target customer Sex: (Maximum 20 Points)
33a - Male (20 Points)
33b - Female (20 Points)
33c - Any/All of the above (5 points)

34 - Primary target customer age range:
34a - Match equals +/- 3 years (20 Points)
34b - Any/All of the above (5 points)

35 - Primary target relationship status: (Maximum 20 Points)
35a - Single, single income household - No children (20 Points)
35b - Single, single income household - Children living with me (20 Points)
35c - Single, single income household - Children living with my X (20 Points)
35d - Married or Long Term Relationship single income household - No children (20 Points)
35e - Married or Long Term Relationship single income household - Children living with me (20 Points)
35f - Married or Long Term Relationship single income household - Children living with my X (20 Points)
35g - Married or Long Term Relationship two income household - No children (20 Points)
35h - Married or Long Term Relationship two income household - Children living with me (20 Points)
35i - Married or Long Term Relationship two income household - Children living with my X (20 Points)
35j - Any/All of the above (5 points)

36 - Primary target customers income level: (Maximum 20 Points)

36a -  $1    ~ $25,000    (20 Points)

36b - $25,001 ~ $50,000   (20 Points)

36c - $50,001 ~ $75,000   (20 Points)

36d - $75,001 ~ $100,000  (20 Points)

36e - $100,001~$150,000 (20 Points)

36f  - $150,001~$200,000 (20 Points)

36g - $200,001~$250,000 (20 Points)

36h - More than $250,000 (20 Points)

36i  - Any / All of the above (5 Points)

Figure 4

Business consumer match criteria and scores continued:

37 - Primary target customer's employment status: (Maximum 20 Points)
37a - Business owner - Sole Proprietor (20 Points)
37b - Employee (20 Points)
37c - Manager (20 Points)
37d - Director (20 Points)
37e - Vice President (20 Points)
37f - President (20 Points)
37g - Corporate level executive (i.e. CEO, CFO, COO, CIO, etc) (20 Points)
37h - Full time Student (20 Points)
37i - Unemployed (20 Points)
37j - Any/All of the above (5 points)

38 - Secondary target customer's employment status: (Maximum of 20 Points)
38a - Business owner - Sole Proprietor (20 Points)
38b - Employee (20 Points)
38c - Manager (20 Points)
38d - Director (20 Points)
38e - Vice President (20 Points)
38f - President (20 Points)
38g - Corporate level executive (i.e. CEO, CFO, COO, CIO, etc) (20 Points)
38h - Full time Student (20 Points)
38i - Unemployed (20 Points)
38j - Any/All of the above (5 points)

39 - Primary Target Residential situation: (Maximum 40 Points)
39a - 1 - Home owner - House
39a - 2 - Home owner - Condo or Town house
39a - 3 - Home owner - Mobile home
39b - 1 - Renter - House
39b - 2 - Renter - Condo or Town house
39b - 3 - Renter - Mobile home
39b - 4 - Renter - Apartment
39c - Any/All of the above (5 points)

40 - Auto-fill Business profile match information from tracking consumers Internet activity

Figure 5

Consumer Status Score (CSS): measures a particular consumer's propensity towards consumer-rated businesses relative to other consumers' propensities towards the same consumer-rated businesses.

Average BRA by all common reviewers of businesses also reviewed by a particular consumer —— EQ. 701

$$Z = \frac{\text{Sum of BRA of businesses by all other consumers commonly rated by a particular consumer}}{\text{Number of all businesses rated by the particular consumer}}$$

Average BRA of the particular consumer —— EQ. 703

$$Y = \frac{\text{Sum of all BRA by the particular consumer}}{\text{Number of all businesses rated by the particular consumer}}$$

EQ. 705
$$\text{Delta} = |Z-Y|$$

EQ. 707
$$\text{CSS} = 100 - \text{Delta}$$

Figure 7

Searching Consumer to Consumer Match Score (SCCMS). Purpose is to quantify the match quality between the searching consumers profile and the profile of other consumers who rated a business that matched the searching consumers query.

- Consumer to Consumer matching point values are listed in parenthesis.
- When there is no match the point value will equal zero
- Total accumulative value for lines 67 through 75 can NOT exceed 140 points. Line 76 scores can be added to the total

Searching Consumer Profile (SCP)

60) BCS assigned consumer ID#
61) Consumer's Real Name, Address, City, Zip Code
62) Nick name – (For page listing anonymity)
63) Phone number
64) Email
65) Individual business ratings
66) Overall business ratings average

Consumer match criteria and scores:

<u>67 - Location: (2 Points)</u>
67a - Area code
67b - City
67c - Zip Code

<u>68 - Sex:</u>
68a - Male (5 Points)
68b - Female (5 Points)

<u>69 - Consumer Ranking Score:</u>
69a - Match equals +/- 2 points (10 Points)
69b - Match equals +/- 5 points (5 Points)
69c - Match equals +/- 8 points (3 Points)

<u>70 - Birthday "Age":</u>
70a - Match +/- 2 years (30 Points)
70b - Match +/- 4 years (15 Points)

<u>71 - Which of the following best describes your current employment status? (10 Points)</u>
71a - Commission only wage earner
71b - Hourly wage earner
71c - Salary wage earner
71d - Salary plus commission wage earner
71e - Self employed business owner with no employees
71f - Self employed business owner with some employees
5g - Unemployed

Figure 8

72 - Which of the following best describes your current employment position/title? (15 Points)
72a - Business owner - Sole Proprietor
72b - Employee
72c - Manager
72d - Director
72e - Vice President
72f - President
72g - Corporate level executive (i.e. CEO, CFO, COO, CIO, etc)
72h - Full time Student
72i - Unemployed

73 - What is your annual household income? (15 Points)

73a -   $1   ~ $25,000     73b - $25,001 ~ $50,000

73c - $50,001 ~ $75,000    73d - $75,001 ~ $100,000

73e - $100,001~$150,000    73f - $150,001~$200,000

73g - $200,001~$250,000    73h - More than $250,000

74 - Please select which option best describes your living situation (10 Points)
74a - Single, single income household - No children
74b - Single, single income household - Children living with me
74c - Single, single income household - Children living with my X
74d - Married or Long Term Relationship single income household - No children
74e - Married or Long Term Relationship single income household - Children living with me
74f - Married or Long Term Relationship single income household - Children living with my X
74g - Married or Long Term Relationship two income household - No children
74h - Married or Long Term Relationship two income household - Children living with me
74i - Married or Long Term Relationship two income household - Children living with my X

75 - Residential status (10 Points)
75a - Home owner - *House / *Condo or *Town house / *Mobile home (* add 10 Points if matched)
75b - Renter - *House / *Condo or *Town house / *Mobile home / *Apartment (*add 10 Points if matched)

76 - Personal preference and taste information (Please select which applies best to your preferences in the following categories.) "this info can be either manually input or gathered from the consumer playing the Member Match Game"

76a - Movies (maximum 8 Points total)
76a - 1 - Action/Adventure: Most Favorite / Like them / Don't like them/ Least Favorite (2 Points)
76a - 2 - Comedy: Most Favorite / Like them / Don't like them/ Least Favorite (2 Points)
76a - 3 - Documentary: Most Favorite / Like them / Don't like them/ Least Favorite (2 Points)
76a - 4 - Family: Most Favorite / Like them / Don't like them/ Least Favorite (2 Points)
76a - 5 - Horror: Most Favorite / Like them / Don't like them/ Least Favorite (2 Points)
76a - 6 - Independent Films: Most Favorite / Like them / Don't like them/ Least Favorite (2 Points)
76a - 7 - Mystery: Most Favorite / Like them / Don't like them/ Least Favorite (2 Points)
76a - 8 - Romance: Most Favorite / Like them / Don't like them/ Least Favorite (2 Points)
76a - 9 - Science Fiction: Most Favorite / Like them / Don't like them/ Least Favorite (2 Points)
76a - 10 - Thriller: Most Favorite / Like them / Don't like them/ Least Favorite (2 Points)

Figure 9

76b - Transportation (maximum 5 Points total)
76b - 1 - Sports cars: Most Favorite / Like them / Don't like them/ Least Favorite (3 Points)
76b - 2 - Luxury SUV's: Most Favorite / Like them / Don't like them/ Least Favorite (3 Points)
76b - 3 - Mid-range SUV's: Most Favorite / Like them / Don't like them/ Least Favorite (3 Points)
76b - 4 - Mini Vans: Most Favorite / Like them / Don't like them/ Least Favorite (3 Points)
76b - 5 - Luxury Sedan's: Most Favorite / Like them / Don't like them/ Least Favorite (3 Points)
76b - 6 - Mid-range Sedan's: Most Favorite / Like them / Don't like them/ Least Favorite (3 Points)
76b - 7 - Motorcycles: Most Favorite / Like them / Don't like them/ Least Favorite (3 Points)
76b - 8 - Public Transit: Most Favorite / Like them / Don't like them/ Least Favorite (3 Points)

76c - Pets (maximum 5 Points total)
76c - 1 - Dogs: Most Favorite / Like them / Don't like them/ Least Favorite (3 Points)
76c - 2 - Cats: Most Favorite / Like them / Don't like them/ Least Favorite (3 Points)
76c - 3 - Horses: Most Favorite / Like them / Don't like them/ Least Favorite (3 Points)
76c - 4 - Reptiles: Most Favorite / Like them / Don't like them/ Least Favorite (3 Points)
76c - 5 - Fish: Most Favorite / Like them / Don't like them/ Least Favorite (3 Points)

76d - Preferred Reading (maximum 8 Points total)
76d - 1 - Science Fiction: Most Favorite / Like them / Don't like them/ Least Favorite (3 Points)
76d - 2 - Romance: Most Favorite / Like them / Don't like them/ Least Favorite (3 Points)
76d - 3 - Self Help: Most Favorite / Like them / Don't like them/ Least Favorite (3 Points)
76d - 4 - Finance/Investing: Most Favorite / Like them / Don't like them/ Least Favorite (3 Points)
76d - 5 - Mystery: Most Favorite / Like them / Don't like them/ Least Favorite (3 Points)
76d - 6 - Non-Fiction: Most Favorite / Like them / Don't like them/ Least Favorite (3 Points)

76e - Exercise Habits (10 Points)
76e - 1 - Very light or no exercise...90 minutes of walking or equivalent, every week.
76e - 2 - Light exercise...30 minutes of walking or equivalent everyday.
76e - 3 - Moderate exercise...2 hours of running and some weightlifting or equivalent, every week.
76e - 4 - Heavy exercise...at least 1 hour of running and some weightlifting or equivalent, everyday.

76f - Favorite Music (maximum 8 Points total)
76f - 1 - Alternative: Most Favorite / Like them / Don't like them/ Least Favorite (2 Points)
76f - 2 - Big Band Swing: Most Favorite / Like them / Don't like them/ Least Favorite (2 Points)
76f - 3 - Bluegrass: Most Favorite / Like them / Don't like them/ Least Favorite (2 Points)
76f - 4 - Blues: Most Favorite / Like them / Don't like them/ Least Favorite (2 Points)
76f - 5 - Contemporary Christian: Most Favorite / Like them / Don't like them/ Least Favorite (2 Points)
76f - 6 - Classic Country: Most Favorite / Like them / Don't like them/ Least Favorite (2 Points)
76f - 7 - Today's Country: Most Favorite / Like them / Don't like them/ Least Favorite (2 Points)
76f - 8 - Classical: Most Favorite / Like them / Don't like them/ Least Favorite (2 Points)
76f - 9 - Dance: Most Favorite / Like them / Don't like them/ Least Favorite (2 Points)
76f - 10 - Gospel: Most Favorite / Like them / Don't like them/ Least Favorite (2 Points)
76f - 11 - Heavy Metal: Most Favorite / Like them / Don't like them/ Least Favorite (2 Points)
76f - 12 - Hip Hop: Most Favorite / Like them / Don't like them/ Least Favorite (2 Points)
76f - 13 - Current Hit List: Most Favorite / Like them / Don't like them/ Least Favorite (2 Points)
76f - 14 - Jazz: Most Favorite / Like them / Don't like them/ Least Favorite (2 Points)

Figure 10

76g - 15 - Rap: Most Favorite / Like them / Don't like them/ Really Dislike (2 Points)
76g - 16 - Reggae: Most Favorite / Like them / Don't like them/ Really Dislike (2 Points)
76g - 17 - Retro Active: Most Favorite / Like them / Don't like them/ Really Dislike (2 Points)
76g - 18 - Classic Rock: Most Favorite / Like them / Don't like them/ Really Dislike (2 Points)
76g - 19 - Solid Gold Oldies: Most Favorite / Like them / Don't like them/ Really Dislike (2 Points)
76g - 20 - Salsa: : Most Favorite / Like them / Don't like them/ Really Dislike (2 Points)
76g - 21 - Soundscapes: Most Favorite / Like them / Don't like them/ Really Dislike (2 Points)

<u>76i - Personality Traits: (Maximum 10 points)</u>
Pick one...(5 points)
76h - 1a - During my spare time I really like my solitude
76h - 1b - During my spare time I really like to be with family
76h - 1c - During my spare time I really like being with friends and family as much as possible Pick one...(5 points)
76i - 2a - When I do go out I usually choose very quiet serene places
76i - 2b - When I do go out I usually choose places with lots of people but stick to myself
76i - 2c - When I do go out I usually pick places mingle with lots of people and express myself <u>76j - Purchasing Preferences: (No maximum 5 points for each double match)</u>
In order of importance "ONE" being most important, select your number ONE and TWO criteria you
would use for purchasing each of the following products or services. Choose the criteria you would use
even if you don't currently use the product or service
76j - 1a - Groceries, Personal Care Items: Price
76j - 1b - Groceries, Personal Care Items: Quality
76j - 1c - Groceries, Personal Care Items: Availability
76j - 1d - Groceries, Personal Care Items: Location, Convenience
76j - 1e - Groceries, Personal Care Items: Unique Services 76j - 2a - Eating Out: Price
76j - 2b - Eating Out: Quality
76j - 2c - Eating Out: Availability
76j - 2d - Eating Out: Location, Convenience
76j - 2e - Eating Out: Unique Services 76j - 3a - Books, Music, Video's: Price
76j - 3b - Books, Music, Video's: Quality
76j - 3c - Books, Music, Video's: Availability
76j - 3d - Books, Music, Video's: Location, Convenience
76j - 3e - Books, Music, Video's: Unique Services 76j - 4a - Computer Software, Hardware, Accessories: Price
76j - 4b - Computer Software, Hardware, Accessories: Quality
76j - 4c - Computer Software, Hardware, Accessories: Availability
76j - 4d - Computer Software, Hardware, Accessories: Location, Convenience
76j - 4e - Computer Software, Hardware, Accessories: Unique Services 76j - 5a - Tickets to Sports events, Theatre, Movies etc: Price
76j - 5b - Tickets to Sports events, Theatre, Movies etc: Quality
76j - 5c - Tickets to Sports events, Theatre, Movies etc: Availability
76j - 5d - Tickets to Sports events, Theatre, Movies etc: Location, Convenience
76j - 5e - Tickets to Sports events, Theatre, Movies etc: Unique Services

Figure 11

76j - 6a - Airline Tickets: Price
76j - 6b - Airline Tickets: Quality
76j - 6c - Airline Tickets: Availability
76j - 6d - Airline Tickets: Location, Convenience
76j - 6e - Airline Tickets: Unique Services 76j - 7a - Car Rentals: Price
76j - 7b - Car Rentals: Quality
76j - 7c - Car Rentals: Availability
76j - 7d - Car Rentals: Location, Convenience
76j - 7e - Car Rentals: Unique Services 76j - 8a - Hotels: Price
76j - 8b - Hotels: Quality
76j - 8c - Hotels: Availability
76j - 8d - Hotels: Location, Convenience
76j - 8e - Hotels: Unique Services 76j - 9a - Auto Mechanics: Price
76j - 9b - Auto Mechanics: Quality
76j - 9c - Auto Mechanics: Availability
76j - 9d - Auto Mechanics: Location, Convenience
76j - 9e - Auto Mechanics: Unique Services 76j - 10a - Maid/House cleaning services: Price
76j - 10b - Maid/House cleaning services: Quality
76j - 10c - Maid/House cleaning services: Availability
76j - 10d - Maid/House cleaning services: Location, Convenience
76j - 10e - Maid/House cleaning services: Unique Services 76j - 11a - Gardening/Landscaping: Price
76j - 11b - Gardening/Landscaping: Quality
76j - 11c - Gardening/Landscaping: Availability
76j - 11d - Gardening/Landscaping: Location, Convenience
76j - 11e - Gardening/Landscaping: Unique Services 76j - 12a - Contractors/Handyman: Price
76j - 12b - Contractors/Handyman: Quality
76j - 12c - Contractors/Handyman: Availability
76j - 12d - Contractors/Handyman: Location, Convenience
76j - 12e - Contractors/Handyman: Unique Services 76j - 13a - Painters: Price
76j - 13b - Painters: Quality
76j - 13c - Painters: Availability
76j - 13d - Painters: Location, Convenience
76j - 13e - Painters: Unique Services

Figure 12

76j - 14a - Veterinarians: Price
76j - 14b - Veterinarians: Quality
76j - 14c - Veterinarians: Availability
76j - 14d - Veterinarians: Location, Convenience
76j - 14e - Veterinarians: Unique Services 76j - 15a - Doctors: Price
76j - 15b - Doctors: Quality
76j - 15c - Doctors: Availability
76j - 15d - Doctors: Location, Convenience
76j - 15e - Doctors: Unique Services 76j - 16a - Hair Stylists: Price
76j - 16b - Hair Stylists: Quality
76j - 16c - Hair Stylists: Availability
76j - 16d - Hair Stylists: Location, Convenience
76j - 16e - Hair Stylists: Unique Services 76j - 17a - Massage Therapists: Price
76j - 17b - Massage Therapists: Quality
76j - 17c - Massage Therapists: Availability
76j - 17d - Massage Therapists: Location, Convenience
76j - 17e - Massage Therapists: Unique Services 76j - 18a - Car Wash/Auto detailer: Price
76j - 18b - Car Wash/Auto detailer: Quality
76j - 18c - Car Wash/Auto detailer: Availability
76j - 18d - Car Wash/Auto detailer: Location, Convenience
76j - 18e - Car Wash/Auto detailer: Unique Services 76j - 19a - Gym/Work Out Facility: Price
76j - 19b - Gym/Work Out Facility: Quality
76j - 19c - Gym/Work Out Facility: Availability
76j - 19d - Gym/Work Out Facility: Location, Convenience
76j - 19e - Gym/Work Out Facility: Unique Services 76j - 20a - Pharmacy: Price
76j - 20b - Pharmacy: Quality
76j - 20c - Pharmacy: Availability
76j - 20d - Pharmacy: Location, Convenience
76j - 20e - Pharmacy: Unique Services 76j - 21a - Lawyers/Legal Services: Price
76j - 21b - Lawyers/Legal Services: Quality
76j - 21c - Lawyers/Legal Services: Availability
76j - 21d - Lawyers/Legal Services: Location, Convenience
76j - 21e - Lawyers/Legal Services: Unique Services

Figure 13

Example:

Searching Consumer's Profile (SCP)

67a = 408 (2 Points) **
67b = San Jose (2 Points) **
67c = 95112 (2 Points) **
68a - Male (5 Points) **
71c - Salary wage earner (10 Points) **
74c - Single, single income household - Children living with my X (10 Points) **
76a - 2 - Comedy: Most Favorite / Like them / Don't like them/ Least Favorite (2 Points) **
76a - 3 - Documentary: Most Favorite / Like them / Don't like them/ Least Favorite (2 Points)
76a - 4 - Family: Most Favorite / Like them / Don't like them/ Least Favorite (2 Points) **
76b - 2 - Luxury SUV's: Most Favorite / Like them / Don't like them/ Least Favorite (3 Points)
76b - 3 - Mid-range SUV's: Most Favorite / Like them / Don't like them/ Least Favorite (3 Points) **
76b - 4 - Mini Vans: Most Favorite / Like them / Don't like them/ Least Favorite (3 Points)
76h - 1a - During my spare time I really like my solitude (5 Points)

Business Evaluator's Profile (BEP)

67a = 408 (2 Points) **
67b = San Jose (2 Points) **
67c = 95112 (2 Points) **
68a - Male (5 Points) **
71c - Salary wage earner (10 Points) **
74c - Single, single income household - Children living with my X (10 Points) **
76a - 2 - Comedy: Most Favorite / Like them / Don't like them/ Least Favorite (2 Points) **
76a - 3 - Documentary: Most Favorite / Like them / Don't like them/ Least Favorite (2 Points)
76a - 4 - Family: Most Favorite / Like them / Don't like them/ Least Favorite (2 Points) **
76b - 2 - Luxury SUV's: Most Favorite / Like them / Don't like them/ Least Favorite (3 Points)
76b - 3 - Mid-range SUV's: Most Favorite / Like them / Don't like them/ Least Favorite (3 Points) **
76b - 4 - Mini Vans: Most Favorite / Like them / Don't like them/ Least Favorite (3 Points)
76h - 1b - During my spare time I really like to be with family (5 Points)

** indicates Match between Searching consumer and consumer

Searching Consumer to Consumer Match Score (SCCMS) Total =   38 points

Figure 14

Business Rating Average (BRA): an average consumer rating for a particular business. Consumer Given Rating (CSGR) is a consumer's given rating to the particular business. In one example, BRA and CSGR are range-bound between 0~100.

Business Rating Average Calculation Method 1 — EQ. 1501

$$BRA_1 = \frac{CSGR_1 + CSGR_2 + \ldots + CSGR_n}{n},$$

n = number of BE's and SC reviewing a particular business

CSGR = Consumer Given Rating

Business Rating Average Calculation Method 2 — EQ. 1503

$$CSGR_n = \frac{Cat_1 + Cat_2 + \ldots + Cat_m}{m},$$

$$BRA_2 = \frac{CSGR_1 + CSGR_2 + \ldots + CSGR_n}{n}$$

n = number of BE's and SC reviewing a particular business

Cat = categories per particular business m = number of categories per CSGR

CSGR = Consumer Given Rating

Figure 15

Consumer to Business Rating (CSBR): provides a weighted value to the CSGR for a particular business based on the quality of the profile match between the Searching Consumer (SC) and Business Evaluators (BE's) who rated the particular business.

EQ. 1601

$$CSBR = \frac{SCCMS}{100} \times CSGR$$

SCCMS = Searching Consumer to Other Consumer (i.e. Business Evaluator) Match Score CSGR = Consumer Given Rating Average Match Score (AMS): is the averaged rating score from the sum of the combined business profile and consumer match scoring criteria.

EQ. 1603

$$AMS = \frac{SCBMS + SCCMS + CBMS + CSS + CSBR}{5}$$

SCBMS = Searching Consumer to Business Match Score
SCCMS = Searching Consumer to Other Consumer Match Score
CBMS = Consumer to Business Match Score
CSS = Consumer Status Score
CSBR = Consumer to Business Rating

Figure 16

Weighted Match Score (WMS): provides an overall value for the match quality between a Searching Consumer (SC) and a particular business rated by the Searching Consumer (SC), and a particular Business Evaluator (BE).

EQ. 1701

$$WMS = \frac{AMS + CSGR}{2},$$

AMS = Average Match Score
CSGR = Consumer Given Rating for a particular Business Evaluator Personalized Business Rating by each Business Evaluator (PBRBE): provides a personalized business rating to a searching consumer specifically in relation to a particular Business Evaluator.

EQ. 1703

$$PBRBE = \frac{WMS \times 2 + BRA}{3} = \frac{AMS + CSGR + BRA}{3}$$

WMS = Weighted Match Score
AMS = Average Match Score
BRA = Business Rating Average

Figure 17

Personalized Business Rating (PBR): an average score of a plurality of PBRBE, thereby serving as a net <u>personalized</u> score of all business ratings per business for a searching consumer.

EQ. 1801

$$PBR = \frac{PBRBE_1 + PBRBE_2 + \ldots + PBRBE_y}{y}$$

PBRBE = Personalized Business Rating by each Business Evaluator y = Number of Relevant Business Evaluators

Figure 18

METHOD AND APPARTUS FOR PERSONALIZED CONSUMER TO BUSINESS MATCHMAKING

BACKGROUND

Proliferation of the Internet among consumers at the turn of the $21^{st}$ century has created a tremendous market opportunity and expansion in e-commerce. An increasing number of consumers shop online for products and services as most offline businesses find Internet storefronts and service enablement as essential components of their business strategies.

Many consumers gain valuable insight into a variety of businesses available both online and offline by reading consumer reviews and ratings online. Some web services, including "Epinions.com," specialize in company and product reviews by registered consumers to their websites. Some of these websites provide a compensation structure for the registered consumers reviewing certain types of products and companies. Most of the consumer rating systems use a simple star rating system or a numerical evaluation system which also displays reviewers' comments.

Search engines and internet portal sites provide another medium of presenting peer consumer reviews of corporate services and products to a searching consumer. Similar to web services specializing in consumer reviews, a simple star or numerical rating system is typically related to a particular service or a particular product displayed by a search engine or an Internet portal site, with commenting sections available for brief written reviews or comments by consumers.

However, conventional star rating systems and numerical rating systems do not take a searching consumer's personal tastes and background into account when displaying results of consumer-reviewed products and services. Furthermore, conventional star rating systems and numerical rating systems do not filter or quantitatively assess reviewers who may have substantially different tastes and background. Therefore, a searching consumer of products or services will appreciate a more personalized consumer to business matchmaking system and method which can quantify and assess correlations among a company offering products or services, consumers who have reviewed those products or services, and searching consumers looking for the reviewed products or services.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a personalized consumer to business matchmaking system comprises a business profile configured to contain business-relevant information, wherein the business-relevant information includes corporate-specific and corporate-desired data relevant to a particular business, a searching consumer's profile configured to contain searching consumer-relevant information, wherein the searching consumer-relevant information includes consumer-specific and consumer-desired data relevant to the searching consumer for desired businesses, and wherein the searching consumer's profile is compared against the business profile to derive a Searching Consumer to Business Match Score (SCBMS), a business evaluator's consumer profile, wherein the business evaluator has previously reviewed, rated, and/or evaluated the particular business and wherein the business evaluator's consumer profile is used to derive a Searching Consumer to Consumer Match Score (SCCMS) and a Consumer to Business Match Score (CBMS), a Consumer Status Score (CSS) calculator configured to measure a first business rating tendency displayed by the searching consumer against a second business rating tendency displayed by the business evaluator, and a consumer rating calculator configured to provide a weighted value to a Consumer Given Rating (CSGR) for the particular business given by the business evaluator by incorporating the Searching Consumer to Consumer Match Score (SCCMS), wherein the weighted value is called a Consumer to Business Rating (CSBR).

Furthermore, in another embodiment of the invention, a method of matchmaking a searching consumer to a desired business by the searching consumer comprises entering information in search criteria to seek the desired business offering a particular product or service, finding a relevant business profile to the search criteria, comparing a profile of the searching consumer with the relevant business profile to derive a Searching Consumer to Business Match Score (SCBMS), comparing one or more profiles of one or more consumers with the relevant business profile to derive a Consumer to Business Match Score (CBMS), wherein the Consumer to Business Match Score (CBMS) is either calculated dynamically or retrieved from a database, deriving a Consumer Status Score (CSS) from the searching consumer and the one or more business evaluators who rated the desired business, wherein the Consumer Status Score (CSS) measures a difference between a first business rating tendency displayed by the searching consumer against a second business rating tendency displayed by the one or more business evaluators, comparing the one or more profiles of the one or more business evaluators with the profile of the searching consumer to derive a Searching Consumer to Consumer Match Score (SCCMS), and deriving a Consumer to Business Rating (CSBR) based on at least one Consumer Given Rating (CSGR) of the desired business by the one or more business evaluators and the Searching Consumer to Consumer Match Score (SCCMS).

Moreover, in another embodiment of the invention, a personalized consumer to business matchmaking system comprises a business profile configured to contain business-relevant information, wherein the business-relevant information includes corporate-specific and corporate-desired data relevant to a particular business, a searching consumer's profile configured to contain searching consumer-relevant information, wherein the searching consumer-relevant information includes consumer-specific and consumer-desired data relevant to the searching consumer for desired businesses, and wherein the searching consumer's profile is compared against the business profile to derive a Searching Consumer to Business Match Score (SCBMS), a plurality of consumer profiles for a plurality of business evaluators, wherein the plurality of business evaluators has previously reviewed, rated, and/or evaluated the particular business and wherein the plurality of consumer profiles for the plurality of business evaluators is used to derive a Searching Consumer to Consumer Match Score (SCCMS) and a Consumer to Business Match Score (CBMS), a Consumer Status Score (CSS) calculator configured to measure a first business rating tendency displayed by the searching consumer against a second business rating tendency displayed by the plurality of business evaluators, a Business Rating Average (BRA) calculator configured to provide a BRA value for the particular business rated by the plurality of business evaluators, and a consumer rating calculator configured to provide a weighted value to the BRA value for the particular business given by the plurality of business evaluators by incorporating the Searching Consumer to Consumer Match Score (SCCMS), wherein the weighted value is called a Consumer to Business Rating (CSBR).

BRIEF DESCRIPTION OF DRAWINGS

FIG. 3 shows an example of business profile information for deriving a Searching Consumer to Business Match Score (SCBMS) and a Consumer to Business Match Score (CBMS) in accordance with an embodiment of the invention.

FIG. 4 shows a further example of business profile information for deriving a Searching Consumer to Business Match Score (SCBMS) and a Consumer to Business Match Score (CBMS) in accordance with an embodiment of the invention.

FIG. 5 shows a further example of business profile information for deriving a Searching Consumer to Business Match Score (SCBMS) and a Consumer to Business Match Score (CBMS) in accordance with an embodiment of the invention.

FIG. 7 shows an example of calculating a Consumer Status Score (CSS) in accordance with an embodiment of the invention.

FIG. 8 shows an example of quantifying a Searching Consumer to Consumer Match Score (SCCMS) in accordance with an embodiment of the invention.

FIG. 9 shows a further example of quantifying a Searching Consumer to Consumer Match Score (SCCMS) in accordance with an embodiment of the invention.

FIG. 10 shows a further example of quantifying a Searching Consumer to Consumer Match Score (SCCMS) in accordance with an embodiment of the invention.

FIG. 11 shows a further example of quantifying a Searching Consumer to Consumer Match Score (SCCMS) in accordance with an embodiment of the invention.

FIG. 12 shows a further example of quantifying a Searching Consumer to Consumer Match Score (SCCMS) in accordance with an embodiment of the invention.

FIG. 13 shows a further example of quantifying a Searching Consumer to Consumer Match Score (SCCMS) in accordance with an embodiment of the invention.

FIG. 14 shows an example of calculating a Searching Consumer to Consumer Match Score (SCCMS) in accordance with an embodiment of the invention.

FIG. 15 shows an example of calculating a Business Rating Average (BRA) in accordance with an embodiment of the invention.

FIG. 16 shows an example of calculating a Consumer to Business Rating (CSBR) and an Average Match Score (AMS) in accordance with an embodiment of the invention.

FIG. 17 shows an example of calculating a Weighted Match Score (WMS) and a Personalized Business Rating by each Business Evaluator (PBRBE) in accordance with an embodiment of the invention.

FIG. 18 shows an example of calculating a Personalized Business Rating (PBR) in accordance with an embodiment of the invention.

DETAILED DESCRIPTION

Figure 1:
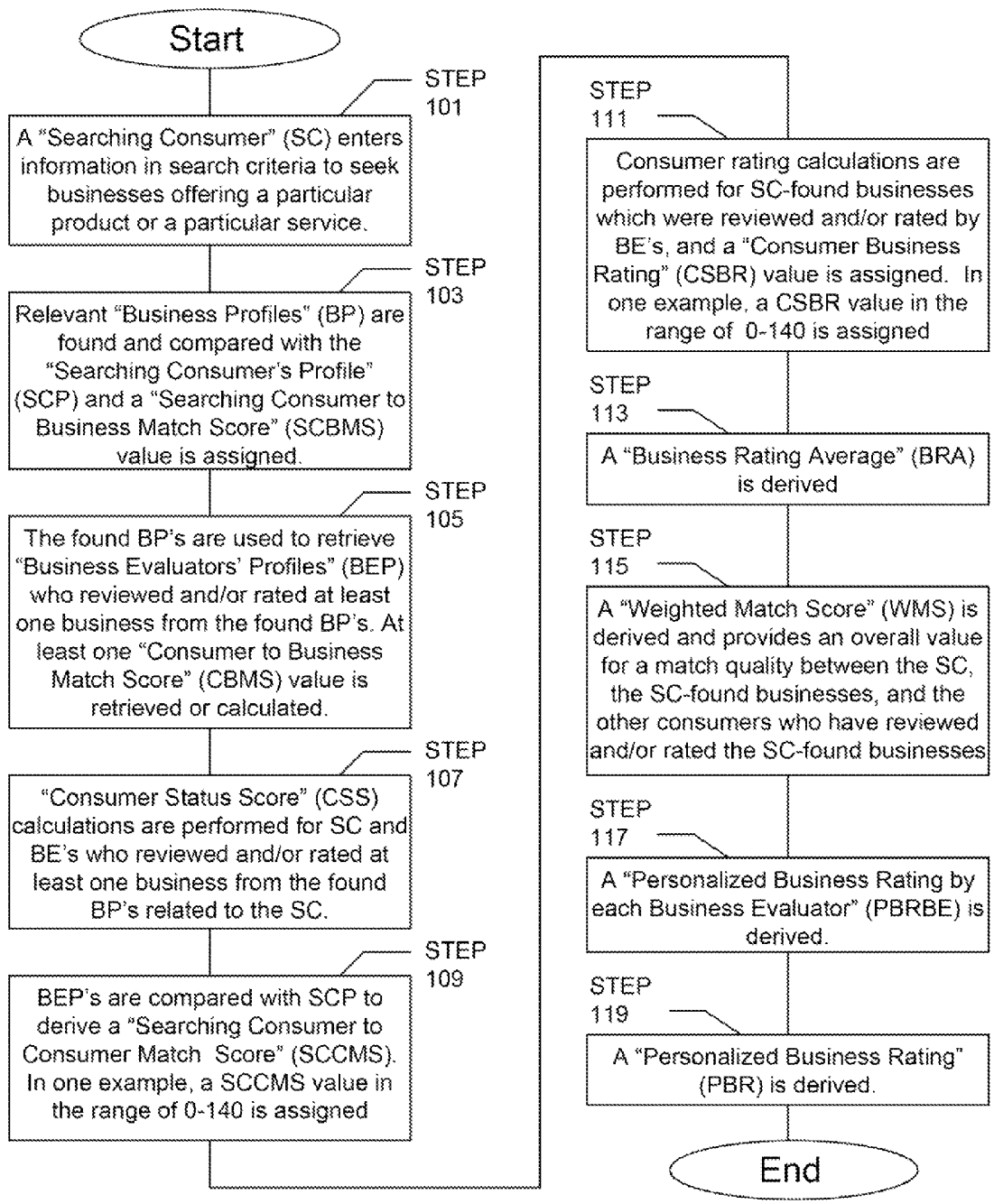
FIG. 1 shows a flowchart of a personalized consumer to business matchmaking system in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to consumer to business matchmaking systems and services based on consumer reviews. More specifically, embodiments of the invention relate to a personalized consumer to business matchmaking system and method which can quantify and assess correlations among a company offering products or services, consumers who have reviewed those products or services, and searching consumers looking for the reviewed products or services.

Furthermore, one objective of the invention is to provide a systematic method for quantifying compatibilities between a consumer and business products or services. Another objective of the invention is to provide a systematic method and an apparatus for pre-qualifying compatibilities between a consumer and business products or services. A further objective of the invention is to quantify and assess compatibility relationships among a company's products or services, product or services reviewers, and a searching consumer interested in the company's products or services.

The following are definitions of some of the terms used for the purpose of this specification:

Searching Consumer (SC): a consumer who is searching for desired businesses using the personalized consumer to business matchmaking method and system as embodied by the present invention.

Business Evaluator (BE): one or more "other" consumers who have reviewed and rated at least one business of interest by the Searching Consumer (SC).

Searching Consumer's Profile (SCP): a consumer profile containing biographical, personal, and other consumer-related information for a Searching Consumer (SC).

Business Evaluator's Profile (BEP): a consumer profile containing biographical, personal, and other consumer-related information for a Business Evaluator (BE).

Business Profile (BP): a business profile containing business-relevant information including corporate-specific and corporate-desired data relevant to a particular business.

Searching Consumer to Business Match Score (SCBMS): a score derived after a profile comparison between a Searching Consumer's Profile (SCP) and a Business Profile (BP).

Searching Consumer to Consumer Match Score (SCCMS): a score derived after a profile comparison between a Searching Consumer's Profile (SCP) and a Business Evaluator's Profile (BEP).

Consumer to Business Match Score (CBMS): a score derived after a profile comparison between a Business Evaluator's Profile (BEP) and a Business Profile (BP).

Consumer Status Score (CSS): a score measuring a particular consumer's propensity towards consumer-rated businesses relative to other consumer's propensities towards the same consumer-rated businesses.

Consumer Given Rating (CSGR): a consumer's given business rating to a particular business.

Consumer Business Rating (CSBR): a score which provides a weighted value to a particular CSGR for a particular business based on the quality of the profile match between the Searching Consumer (SC) and Business Evaluators (BE's).

Business Rating Average (BRA): an average consumer rating for a particular business (e.g. an average of a plurality of CSGR's).

Average Match Score (AMS): an average rating score form a sum of combined business profile and consumer match scoring criteria.

Weighted Match Score (WMS): a score which provides an overall value for the match quality between a Searching Consumer (CS) and a particular business rated by the Searching Consumer (SC) and a particular Business Evaluator (BE).

Personalized Business Rating by each Business Evaluator (PBRBE): a score which provides a personalized business rating to a Searching Consumer (SC) specifically in relation to a particular Business Evaluator (BE).

Personalized Business Rating (PBR): an average score of a plurality of PBRBE, thereby serving as a net personalized score of all business ratings per business for a Searching Consumer (SC).

FIG. 1 shows a flowchart of a personalized consumer to business matchmaking system in accordance with an embodiment of the invention. In STEP 101, a Searching Consumer (SC) of products and services enters information in search criteria in a computer interface to seek businesses offering a particular product or a particular service. The information entered by the Searching Consumer (SC) can include keywords related to desired products or services, names of businesses, and other consumer-specific and/or consumer-desired data. In one embodiment of the invention the computer interface used by the Searching Consumer (SC) is connected to an Internet search engine and the personalized consumer to business matchmaking system. In another embodiment of the invention, the computer interface used by the Searching Consumer (SC) is connected to the personalized consumer to business matchmaking system and a consumer review website which is configured to maintain a plurality of consumer reviews for a variety of products and services.

In STEP 103, the information entered by the Searching Consumer (SC) prompts the personalized consumer to business matchmaking system to retrieve one or more Business Profiles (BP) determined to be relevant to consumer-specific and consumer-desired data. The Business Profiles are then compared with the Searching Consumer's Profile (SCP) to derive a Searching Consumer to Business Match Score (SCBMS) for each Business Profile (BP). In one example, the Searching Consumer to Business Match Score (SCBMS) is a profile comparison score between a Searching Consumer (SC) and a Business Profile (BP). In one embodiment of the invention, an SCBMS score is calculated after comparing geographic, gender, income, education, employment, purchase preferences, and/or hobby information in the Searching Consumer's Profile (SCP) with desired consumer target requirement from each Business Profile (BP). In another embodiment of the invention, an SCBMS score is simply retrieved from a database operatively connected to the personalized consumer to business matchmaking system, because the SCBMS calculation is previously performed and saved in the database.

Continuing with FIG. 1, in STEP 105, the retrieved Business Profiles (BP) are used to retrieve Business Evaluators' Profiles (BEP), which include information of "other consumers" who reviewed and rated at least one business related to the retrieved Business Profiles (BP). For the context of this specification, the term "Business Evaluators" (BE's) refer to "other consumers" who reviewed and rated at least one business related to the retrieved Business Profile (BP). Then, a Consumer to Business Match Score (CBMS) is calculated. In one example, the Consumer to Business Match Score (CBMS) is a profile comparison score between a Business Evaluator (BE) and a Business Profile (BP). In one embodiment of the invention, a Consumer to Business Match Score (CBMS) is calculated after comparing geographic, gender, income, education, employment, purchase preferences, and/or hobby information in each Business Evaluator's Profile (BEP) with desired consumer target requirement from each Business Profile (BP). In another embodiment of the invention, a CBMS score is simply retrieved from a database operatively connected to the personalized consumer to business matchmaking system, because the CBMS calculation is previously performed and saved in the database.

In STEP 107, the personalized consumer to business matchmaking system performs Consumer Status Score (CSS) calculations to derive a Consumer Status Score (CSS). The Consumer Status Score (CSS) measures a Searching Consumer's propensity towards consumer-rated businesses relative to Business Evaluators' propensities towards the same consumer-rated businesses. In one embodiment of the invention, CSS values are calculated using EQ. 701, EQ. 703, EQ. 705, and EQ. 707 of FIG. 7, wherein a higher CSS value indicates closer similarity of consumer reviewing behavior between a particular consumer (e.g. a Searching Consumer) and Business Evaluators, and a lower CSS value indicates a divergent consumer reviewing behavior between the particular consumer and Business Evaluators.

Continuing with FIG. 1, the personalized consumer to business matchmaking system derives a Searching Consumer to Consumer Match Score (SCCMS) by comparing each Business Evaluator's Profile (BEP) with the Searching Consumer's Profile (SCP) in STEP 109. In one embodiment of the invention, the Searching Consumer to Consumer-Match Score (SCCMS) is a profile comparison score between two consumer profiles. In one embodiment of the invention, the Searching Consumer to Consumer Match Score (SCCMS) is calculated after comparing geographic, gender, income, education, employment, purchase preferences, and/or hobby information in each Business Evaluator's Profile (BEP) with corresponding information in the Searching Consumer's Profile (SCP). In another embodiment of the invention, the Searching Consumer to Consumer Match Score (SCCMS) is simply retrieved from a database operatively connected to the personalized consumer to business matchmaking system, because the SCCMS calculation is previously performed and saved in the database. In one embodiment of the invention, the SCCMS is assigned a numerical value ranging from 0 to 140.

Then, in STEP 111, the personalized consumer to business matchmaking system derives a Consumer to Business Rating (CSBR) value based on the Searching Consumer to Consumer Match Score (SCCMS) and consumer ratings for each retrieved Business Profile (BP) from STEP 103. The Consumer to Business Rating (CSBR) value is a weighted value to consumer ratings for a particular business by taking the SCCMS into account. In one embodiment of the invention, CSBR values are calculated using EQ. 1601 of FIG. 16, wherein a Consumer's Given Rating (CSGR) by a Business Evaluator (BE) for a particular business is weighted by the Searching Consumer to Consumer Match Score (SCCMS). In one embodiment of the invention, the SCCMS is assigned a numerical value ranging from 0 to 140.

In STEP 113 of FIG. 1, a Business Rating Average (BRA) is derived by calculating an average of consumer ratings for a particular business. In one example of a Business Rating Average metric system, the BRA ranges from 0 to 100. In one embodiment of the invention, a BRA value is calculated by using EQ. 1501 of FIG. 15, wherein the BRA value is a sum of a plurality of Consumer Given Rating (CSGR) divided by the number of Business Evaluators (BE's) and/or a Searching Consumer reviewing a particular business. In another embodiment of the invention, a BRA value is calculated by using EQ. 1503 of FIG. 15, wherein each Consumer Given Rating (CSGR) is an average of all categories per consumer rating and the BRA is an average of a plurality of Consumer Given Ratings (CSGR's).

Continuing with FIG. 1, a Weighted Match Score (WMS) is then derived in STEP 115. The Weighted Match Score (WMS) provides an overall value for a match quality between the Searching Consumer (SC) and a particular business rated by the Searching Consumer (SC) and/or Business Evaluators (BE's). In one embodiment of the invention, a WMS value is calculated using EQ. 1701 of FIG. 17, wherein an average of an Average Match Score (AMS) for the Searching Consumer (SC) and a Consumer Given Rating (CSGR) for the particular business is defined as the Weighted Match Score (WMS).

Then, the personalized consumer to business matchmaking system derives a Personalized Business Rating by each Business Evaluator (PBRBE) in STEP 117 of FIG. 1. The PBRBE is a business rating score by one particular Business Evaluator (BE) which is personalized for the Searching Consumer (SC). In one embodiment of the invention, a PBRBE value is calculated using EQ. 1703 of FIG. 17, wherein the PBRBE value is equivalent to an addition of a BRA value to twice the value of an Weighted Match Score (WMS) divided by three. Alternatively, the PBRBE value is equivalent to a sum of an AMS value, a CSGR value by one particular Business Evaluator, and a Business Rating Average divided by three, as indicated in EQ. 1703 of FIG. 17.

In STEP 119, a Personalized Business Rating (PBR) is derived. The PBR is equivalent to an average of PBRBE's from a multiple number of Business Evaluators (BE's). In one embodiment of the invention, a PBR value is calculated using EQ. 1801 of FIG. 18, wherein the PBR value is equivalent to an addition of relevant PBRBE values divided by the number of relevant Business Evaluators (BE's).

With a Personalized Business Rating (PBR) derived from the flowchart of the personalized consumer to business matchmaking system of FIG. 1 for each Business Profile (BP) relevant to the Searching Consumer's search criteria, a plurality of relevant Business Profiles (BP) can be displayed on a computer interface in a decreasing order of Personalized Business Rating (PBR) or in any other convenient order. The present invention allows searching consumers (SC's) to place priority on business ratings and reviews given by peer consumers (e.g. "Business Evaluators" or "BE's" as defined in the specification) whose interests, background, income-level, hobbies, or other traits are similar to the searching consumers. In an ubiquitous age of the Internet in which consumers are flooded with a mixture of helpful and irrelevant information, the present invention enables consumers to find highly personalized and relevant businesses, services, and product reviews first before digging into less relevant information.

Figure 2:
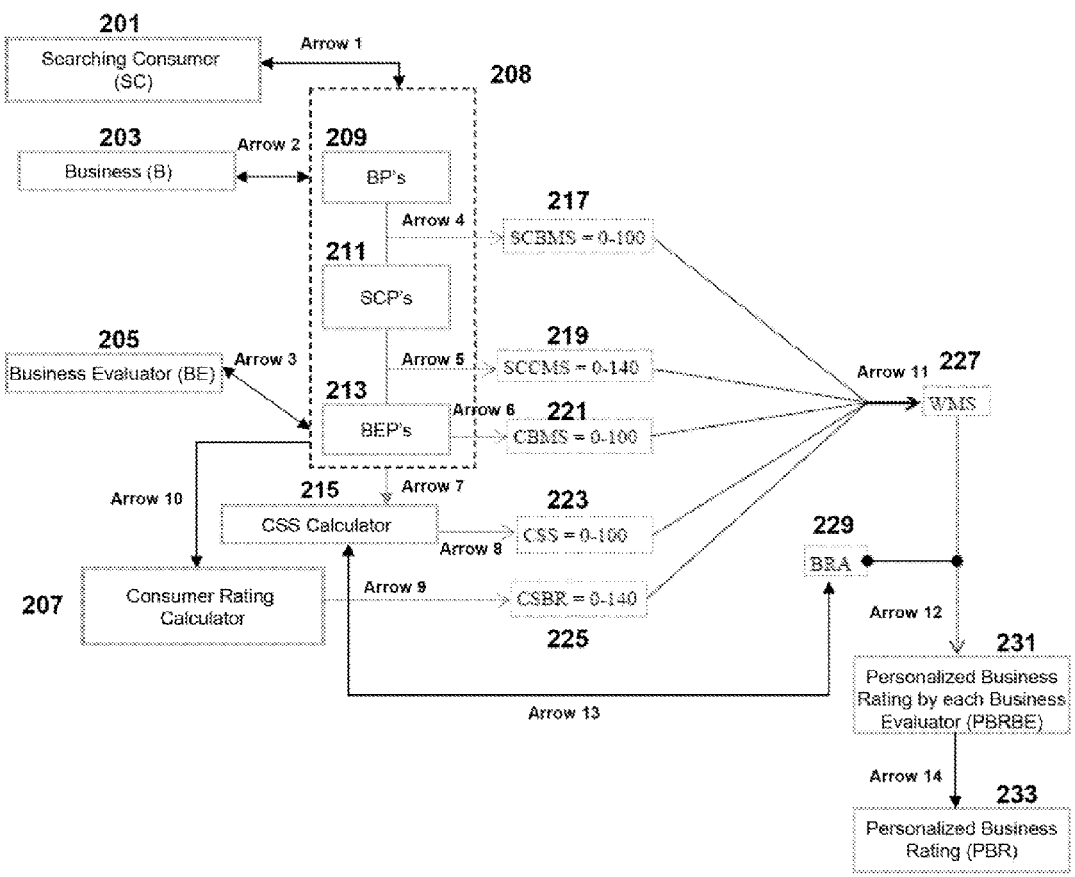
FIG. 2 shows a system diagram of a personalized consumer to business matchmaking system in accordance with an embodiment of the invention.

FIG. 2 shows an example of an overall architecture of a consumer to business matchmaking system 200 in accordance with an embodiment of the invention. This particular overall architecture of the consumer to business matchmaking system is the inventor's best mode of operation for the invention.

In a typical operating environment of the consumer to business matchmaking system, a Searching Consumer (SC) 201 for a particular business offering products or services, a Business (B) 203 offering products or services, and a Business Evaluator (BE) 205 who has rated the Business (B) 203 provide initial dataset to the consumer to business matchmaking system 200. In one embodiment of the invention, the Searching Consumer (SC) 201 at some point provides sufficient searching consumer-relevant information to a system database 208 via Arrow 1, including consumer-specific and consumer-desired data to constitute a Searching Consumer Profile (SCP) 211. Examples of information in the Searching Consumer Profile (SCP) 211 include biographical information, income, purchase traits, hobbies, favorite items, and any other useful information for the personalized consumer to business matchmaking.

Similarly, in one embodiment of the invention, the Business Evaluator 205 who has already rated the Business (B) 203 provides sufficient information to the system database 208 via Arrow 3 to constitute a Business Evaluator's consumer profile (BEP) 213. Examples of information in the Business Evaluator's consumer profile (BEP) 213 include biographical information, income, purchase traits, hobbies, favorite items, business ratings, and any other useful information for the personalized consumer to business matchmaking.

Likewise, in one embodiment of the invention, the Business (B) 203 offering products or services, at some point, provides sufficient business-relevant information to the system database 208 via Arrow 2, including corporate-specific and corporate-desired data to constitute a Business Profile (BP). Examples of information in the Business Profile (BP) 209 include corporate address, auto-filled business profile match information from consumers' Internet activities, and primary target customer information by gender, age, income, marital status, and any other useful information for the personalized consumer to business matchmaking.

Continuing with FIG. 2, when the Searching Consumer (SC) 201 enters information in search criteria of the personalized consumer to business matchmaking system to find one or more relevant or desired business profiles, the personalized consumer to business matchmaking system searches the system database 208 to find relevant Business Profiles (BP). Each relevant Business Profile (BP) is compared with the Searching Consumer Profile (SCP) 211 and a Searching Consumer to Business Match Score (SCBMS) is calculated, derived, and/or assigned in a SCBMS block 217 via Arrow 4, for each comparison between the Searching Consumer Profile (SCP) 211 and each relevant Business Profile (BP). In one embodiment of the invention, SCBMS can range from 0 to 100. Each relevant Business Profile (BP) is also compared against profiles of relevant Business Evaluators (BE's) who reviewed and/or rated at least one relevant business to derive a Consumer to Business Match Score (CBMS) for each relevant business evaluator. The CBMS is derived, calculated, and/or assigned to a CBMS block 221 via Arrow 6. In one embodiment of the invention, CBMS can range from 0 to 100.

In one embodiment of the invention, the consumer to business matchmaking system 200 of FIG. 2 derives a Consumer Status Score (CSS) in a Consumer Status Score (CSS) Calculator 215 and assigns the CSS to a CSS block 223 via Arrow 8. In one operating environment for the consumer to business matchmaking system 200, the Consumer Status Score (CSS) Calculator 215 takes business rating averages of relevant business profiles provided by a BRA database 229 via Arrow 13 to calculate a Consumer Status Score (CSS). The Consumer Status Score (CSS) measures a searching consumer's propensity towards consumer-rated businesses relative to business evaluators' propensities towards the same consumer-rated businesses. In one embodiment of the invention, CSS values are calculated using EQ. 701, EQ. 703, EQ. 705, and EQ. 707 of FIG. 7, wherein a higher CSS value indicates closer similarity of consumer reviewing behavior between a particular consumer (e.g. a Searching Consumer) and Business Evaluators, and a lower CSS value indicates a divergent consumer reviewing behavior between the particular consumer and Business Evaluators. In one embodiment of the invention, CSS can range from 0 to 100.

Continuing with FIG. 2, each relevant business evaluator profile from the system database 208 is compared with the Searching Consumer Profile (SCP) to derive a Searching Consumer to Consumer Match Score (SCCMS). A SCCMS block 219 calculates, derives, and/or assigns a SCCMS value for each comparison via Arrow 5. In one embodiment of the invention, the SCCMS can range from 0 to 140.

Furthermore, a Consumer Rating Calculator 207 of FIG. 2 calculates a Consumer to Business Rating (CSBR) value based on a SCCMS and a Business Evaluator's ratings for a particular business, which are fed into the Consumer Rating Calculator 207 via Arrow 10. A CSBR block 225 is assigned a calculated or derived CSBR value via Arrow 9. The Consumer to Business Rating (CSBR) value is a weighted value to consumer ratings for the particular business by taking the SCCMS into account. In one embodiment of the invention, CSBR values are calculated using EQ. 1601 of FIG. 16, wherein a Consumer's Given Rating (CSGR) by one Business Evaluator (BE) for a particular business is weighted by the Searching Consumer to Consumer Match Score (SCCMS). In one embodiment of the invention, the SCCMS is assigned a numerical value ranging from 0 to 140.

Continuing with FIG. 2, a Weighted Match Score (WMS) is calculated based on values from the SCBMS block 217, the SCCMS block 219, the CBMS block 221, the CSS block 223, and the CSBR block 225. The WMS is assigned to a WMS block 227 via Arrow 11. The Weighted Match Score (WMS) provides an overall value for a match quality between the Searching Consumer (SC) and a particular business rated by the Searching Consumer (SC) and/or Business Evaluators (BE). In one embodiment of the invention, a WMS value is calculated using EQ. 1701 of FIG. 17, wherein an average of an Average Match Score (AMS) for the searching consumer and a Consumer Given Rating (CSGR) by a particular Business Evaluator (BE) for the particular business is defined as the Weighted Match Score (WMS).

Then, the personalized consumer to business matchmaking system derives a Personalized Business Rating by each Business Evaluator (PBRBE) and assigns the PBRBE to a PBRBE block 231 via Arrow 12 in FIG. 2. The PBRBE is a business rating score by one particular Business Evaluator (BE) which is personalized for the Searching Consumer (SC). In one embodiment of the invention, a PBRBE value is calculated using EQ. 1703 of FIG. 17, wherein the PBRBE value is equivalent to an addition of a BRA value to twice the value of an Weighted Match Score (WMS) divided by three. Alternatively, the PBRBE value is equivalent to a sum of an AMS value, a CSGR value by one particular Business Evaluator, and a Business Rating Average divided by three, as indicated in EQ. 1703 of FIG. 17.

Then, the personalized consumer to business matchmaking system derives a Personalized Business Rating (PBR) and assigns the PBR to a PBR block 233 via Arrow 14 in FIG. 2. The PBR is equivalent to an average of PBRBE's from a multiple number of Business Evaluators (BE's). In one embodiment of the invention, a PBR value is calculated using EQ. 1801 of FIG. 18, wherein the PBR value is equivalent to an addition of relevant PBRBE values divided by the number of relevant Business Evaluators (BE's).

FIG. 3 shows an example of business profile information for deriving a Searching Consumer to Business Match Score (SCBMS) and a Consumer to Business Match Score (CBMS) in accordance with an embodiment of the invention. Data fields 20~31 comprising a business profile, as shown in FIG. 3 include corporate-specific and business-relevant information. Some examples from these fields include an assigned company ID (20), a company name and address (21), a phone number (22), a fax number (23), a web site address (24), a business/contractor license number (25), service or product offerings (28), pricing for products or services (30), and other information as shown in FIG. 3. It should be noted that these fields merely serve as exemplary information in one particular business profile and do not limit the present invention in any way.

FIGS. 4 and 5 show an example of business-consumer match and scoring criteria, which are used for deriving a Searching Consumer to Business Match Score (SCBMS) and a Consumer to Business Match Score (CBMS). Data fields 32~39 comprise business-consumer match and scoring criteria, as shown in FIGS. 4 and 5. Some of the business-consumer match and scoring criteria include a service area field (32), a gender field (33), an age field (34), a marital status field (35), an income-level field (36), a primary target customer's employment status field (37), a secondary target customer's employment status field (38), and a primary target customer's residential situation (39). Data fields 32~39 also comprise data sub-fields in alphanumeric format (e.g. $32a$, $32b$, $33c$, $33d$, and etc.) which show detailed selection choices for the business-consumer match and scoring criteria. If there is a match between a particular data sub-field in the business-consumer match and scoring criteria and a Searching Consumer Profile (SCP) or a Business Evaluator's Profile (BEP), each match follows scoring rules in parenthesis next to each data sub-field.

A data field 40 in FIG. 5 can be used for utilizing cookies or cached information from Searching Consumer's and/or business evaluators' Internet activities. It should be noted that these data fields merely serve as exemplary information in one particular business-consumer match and scoring criteria and do not limit the present invention in any way.

Figure 6:
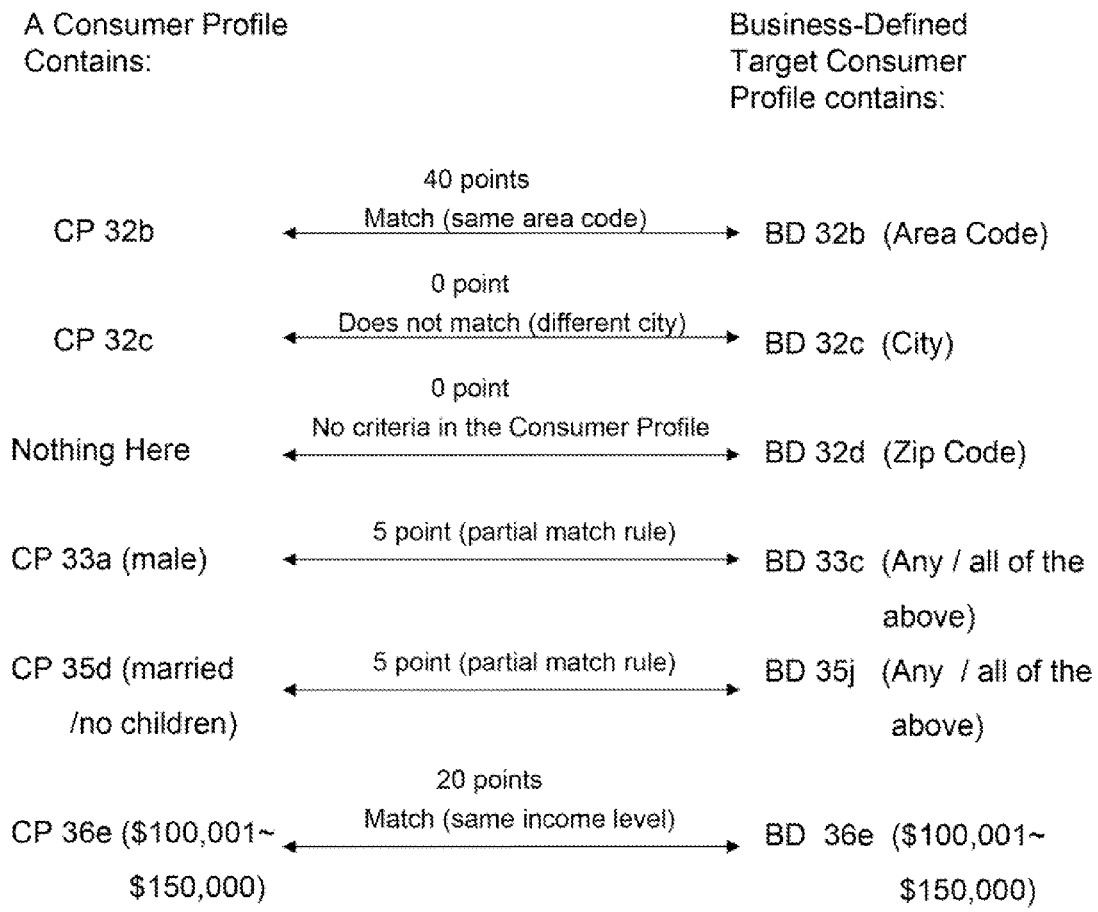
FIG. 6 shows an example of calculating a Consumer to Business Match Score (CBMS) in accordance with an embodiment of the invention.

FIG. 6 shows an example of calculating Consumer to Business Match Score (CBMS) based on data fields presented in FIG. 3~5. A consumer profile (i.e. a Business Evaluator's Profile, or BEP) on the left side of FIG. 6 contains data fields for telephone area code (CP $32b$), city (CP $32c$), gender (CP $33a$), marital status (CP $35d$), and income level (CP $36e$). According to a match rule defined by one example of the business-consumer match and scoring criteria, as shown in FIG. 3~5, a business-defined target consumer profile (i.e. Business Profile, or BP) containing matching data in its data fields result in accumulation of points in a CBMS.

In this particular matching and scoring example shown in FIG. 6, CP $32b$ and RD $32b$ directly matched because they have the same telephone area code. This results in an accumulation of 40 points for the CBMS. On the other hand, CP $32c$ and BD $32c$ do not match and BD $32d$ does not have a corresponding data field in the consumer profile. Therefore, no points accrue for CBMS. For CP $33a$ and BD $33c$, a partial match applies based on a scoring rule in the business-defined target consumer profile, resulting in an accumulation of 5 points to the CBMS. For CP $35d$ and BD $35j$, a partial match applies based on a scoring rule in the business-defined target consumer profile, resulting in an accumulation of 5 points to the CBMS. Lastly, CP $36e$ and BD $36e$ directly matched because they have the same income level, resulting in an accumulation of 20 points to the CBMS. Therefore, the total value for the CBMS is 70 points in this particular matching and scoring example for calculating the CBMS.

FIG. 7 shows an example of calculating a Consumer Status Score (CSS) in accordance with an embodiment of the invention. The Consumer Status Score (CSS) measures a particular consumer's (e.g. a Searching Consumer's) propensity towards consumer-rated businesses relative to Business Evaluators' propensities towards the same consumer-rated businesses. In one embodiment of the invention, CSS values are calculated using EQ. 701, EQ. 703, EQ. 705, and EQ. 707 of FIG. 7, wherein a higher CSS value indicates closer similarity of consumer reviewing behavior between a particular consumer (e.g. a Searching Consumer) and Business Evaluators, and a lower CSS value indicates a divergent consumer reviewing behavior between the particular consumer and Business Evaluators.

FIG. 8~13 show an example of quantifying a Searching Consumer to Consumer Match Score (SCCMS) in accordance with an embodiment of the invention. In one embodiment of the invention, a Searching Consumer Profile (SCP) contains consumer-relevant information including consumer-specific and consumer-desired data. In one example as shown in FIG. 8~13, data fields 60~76 contain the consumer-relevant information, many of which are used for calculating a SCCMS score. The data fields 60~66 include basic Searching Consumer Profile information, including assigned consumer ID for a Searching Consumer (60), name and address (61), a phone number (63), an email (64), individual business ratings given by the Searching Consumer (65), and a Business Ratings Average for the Searching Consumer's business ratings (66). Other data fields in this example have sub-data fields in alphanumeric combinations, sometimes in multiple depth-levels (e.g. 67$a$, 71$a$, 76$j$, 76$j$-1$a$, 76-1$b$, and etc.). The sub-data fields in this example have been used to calculate the Searching Consumer to Consumer Match Score (SCCMS) following scoring rules corresponding to each data field or sub-data field. It should be noted that these data fields merely serve as exemplary information in one particular business-consumer match and scoring criteria and do not limit the present invention in any way.

FIG. 14 shows an example of calculating a Searching Consumer to Consumer Match Score (SCCMS) based on the exemplary match criteria and scores presented in FIG. 8~13. Sub-data fields 67$a$, 67$b$, 67$c$, 68$a$, 71$c$, 74$c$, 76$a$-2, 76$a$-4, and 76$b$-3 from Searching Consumer's Profile (SCP) and Business Evaluator's Profile (BEP) match, resulting in an accumulated SCCMS of 38 based on the exemplary match criteria and scores shown in FIG. 8~14.

FIG. 15 shows an example of calculating a Business Rating Average (BRA) in accordance with an embodiment of the invention. A Business Rating Average (BRA) is derived by calculating an average of consumer ratings for a particular business. In one example of a Business Rating Average metric system, the BRA ranges from 0 to 100. In one embodiment of the invention, a BRA value is calculated by using EQ. 1501 of FIG. 15, wherein the BRA value is a sum of a plurality of Consumer Given Rating (CSGR) by divided by the number of Business Evaluators (BE's) and/or a Searching Consumer reviewing a particular business. In another embodiment of the invention, a BRA value is calculated by using EQ. 1503 of FIG. 15, wherein each Consumer Given Rating (CSCR) is an average of all categories (i.e. $Cat_1$, $Cat_2$, . . . , $Cat_m$) per consumer rating and the BRA is an average of a plurality of Consumer Given Ratings (CSGR's).

FIG. 16 shows an example or calculating a Consumer to Business Rating (CSBR) and an Average Match Score (AMS) in accordance with an embodiment of the invention. The Consumer to Business Rating (CSBR) value is a weighted value to consumer ratings for a particular business by taking the SCCMS into account. In one embodiment of the invention, CSBR values are calculated using EQ. 1601 or FIG. 16, wherein a Consumer's Given Rating (CSCR) by a Business Evaluator (BE) for a particular business is weighted by the Searching Consumer to Consumer Match Score (SCCMS). In one embodiment of the invention, the SCCMS is assigned a numerical value ranging from 0 to 140. The Average Match Score (AMS) is an averaged rating score of many derived personalization scores for the consumer-to-business matchmaking system. In one embodiment of the invention, the AMS is an average of SCBMS, SCCMS, CBMS, CSS, and CSBR, as shown in EQ. 1603.

FIG. 17 shows an example of calculating a Weighted Match Score (WMS) and a Personalized Business Rating by each Business Evaluator (PBRBE) in accordance with an embodiment of the invention. The Weighted Match Score (WMS) provides an overall value for a match quality between the Searching Consumer (SC) and a particular business rated by the Searching Consumer (SC) and/or Business Evaluators (BE's). In one embodiment of the invention, a WMS value is calculated using EQ. 1701 of FIG. 17, wherein an average of an Average Match Score (AMS) for the Searching Consumer (SC) and a Consumer Given Rating (CSGR) for the particular business is defined as the Weighted Match Score (WMS). The PBRBE is a business rating score by one particular Business Evaluator (BE) which is personalized for the Searching Consumer (SC). In one embodiment of the invention, a PBRBE value is calculated using EQ. 1703 of FIG. 17, wherein the PBRBE value is equivalent to an addition of a BRA value to twice the value of a Weighted Match Score (WMS) divided by three. Alternatively, the PBRBE value is equivalent to a sum of an AMS value, a CSCR value by one particular Business Evaluator, and a Business Rating Average divided by three, as indicated in EQ. 1703 of FIG. 17.

FIG. 18 shows an example of calculating a Personalized Business Rating (PBR) in accordance with an embodiment of the invention. The PBR is equivalent to an average of PBRBE's from a multiple number of Business Evaluators (BE's). In one embodiment of the invention, a PBR value is calculated using EQ. 1801 of FIG. 18, wherein the PBR value is equivalent to an addition of relevant PBRBE values divided by the number of relevant Business Evaluators (BE's).

With a Personalized Business Rating (PBR) derived from the personalized consumer to business matchmaking system for each Business Profile (BP) relevant to the Searching Consumer's search criteria, a plurality of relevant Business Profiles (BP) can be displayed on a computer interface in a decreasing order of Personalized Business Rating (PBR) or in any other convenient order. The present invention allows searching consumers (SC's) to place priority on business ratings and reviews given by peer consumers (e.g. "Business Evaluators" or "BE's" as defined in the specification) whose interests, background, income-level, hobbies, or other traits are similar to the searching consumers. In an ubiquitous age of the Internet in which consumers are flooded with a mixture of both helpful and irrelevant information, the present invention enables consumers to find highly personalized and relevant businesses, services, and product reviews first before digging into less relevant information.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A personalized consumer to business matchmaking system executed on a CPU and a memory unit of a computer system, the personalized consumer to business matchmaking system comprising:

a business profile configured to contain business-relevant information, wherein the business-relevant information includes corporate-specific and corporate-desired data relevant to a particular business;

a searching consumer's profile configured to contain searching consumer-relevant information, wherein the searching consumer-relevant information includes consumer-specific and consumer-desired data relevant to the searching consumer for desired businesses, and wherein the searching consumer's profile is compared against the business profile to derive a Searching Consumer to Business Match Score (SCBMS);

a business evaluator's consumer profile, wherein the business evaluator has previously reviewed, rated, and/or evaluated the particular business and wherein the business evaluator's consumer profile is used to derive a Searching Consumer to Consumer Match Score (SCCMS) and a Consumer to Business Match Score (CBMS);

a Consumer Status Score (CSS) calculator executed on the CPU and the memory unit of the computer system, wherein the Consumer Status Score (CSS) calculator is configured to measure a first business rating tendency displayed by the searching consumer against a second business rating tendency displayed by the business evaluator; and a consumer rating calculator executed on the CPU and the memory unit of the computer system, wherein the consumer rating calculator is configured to provide a weighted value to a Consumer Given Rating (CSGR) for the particular business given by the business evaluator by incorporating the Searching Consumer to Consumer Match Score (SCCMS), wherein the weighted value is called a Consumer to Business Rating (CSBR).

2. The personalized consumer to business matchmaking system of claim 1, wherein the CSBR is calculated by multiplying the Consumer Given Rating (CSGR) by the SCCMS divided by 100.

3. The personalized consumer to business matchmaking system of claim 1, further comprising a Business Rating Average (BRA) calculator executed on the CPU and the memory unit of the computer system, wherein the Business Rating Average (BRA) calculator is configured to provide a BRA value for the particular business rated by a plurality of consumers and an Average Match Score (AMS) calculator configured to provide an AMS value by averaging the SCBMS, the SCCMS, the CBMS, the CSS, and the CSBR.

4. The personalized consumer to business matchmaking system of claim 3, further comprising a Weighted Match Score (WMS) calculator executed on the CPU and the memory unit of the computer system, wherein the Weighted Match Score (WMS) calculator is configured to provide a WMS value based on the CSGR value and the AMS value.

5. The personalized consumer to business matchmaking system of claim 4, further comprising a Personalized Business Rating by each Business Evaluator (PBRBE) calculator executed on the CPU and the memory unit of the computer system, wherein the Personalized Business Rating by each Business Evaluator (PBRBE) calculator is configured to provide a PBRBE value based on the BRA value and the WMS value, wherein the PBRBE value is a personalized business rating score by the business evaluator for the searching consumer.

6. The personalized consumer to business matchmaking system of claim 5, wherein the PBRBE value is set to a self-reviewed business rating value of the searching consumer, if the searching consumer already reviewed, rated, and/or evaluated the particular business himself or herself.

7. The personalized consumer to business matchmaking system of claim 5, wherein the PBRBE value is set to the Searching Consumer to Business Match Score (SCBMS), if nobody reviewed, rated, and/or evaluated the particular business.

8. The personalized consumer to business matchmaking system of claim 5, further comprising a Personalized Business Rating (PBR) calculator executed on the CPU and the memory unit of the computer system, wherein the Personalized Business Rating (PBR) calculator is configured to provide a PBR value, wherein the PBR value is an average of a plurality of PBRBE values.

* * * * *